Aug. 22, 1933.  B. McL. MIDDLETON  1,923,838
COTTON GIN
Filed June 1, 1931
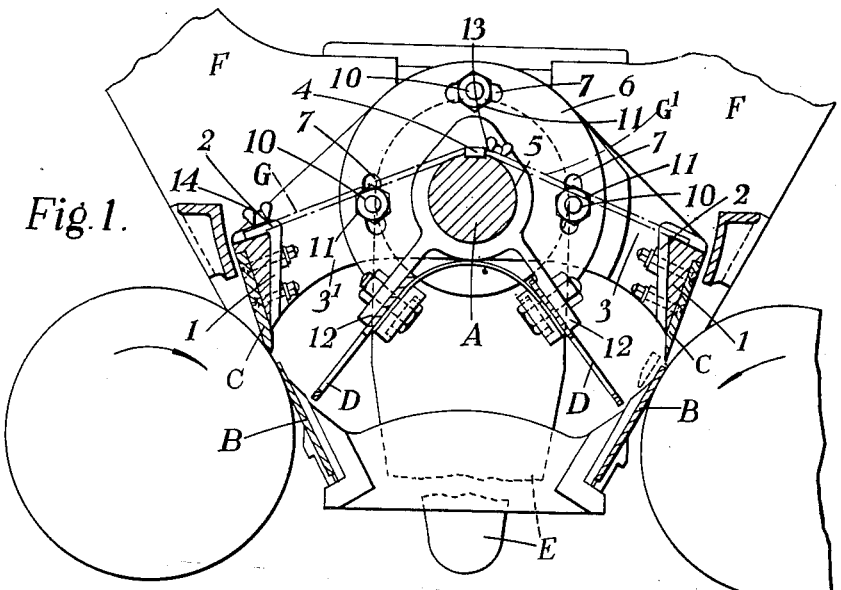
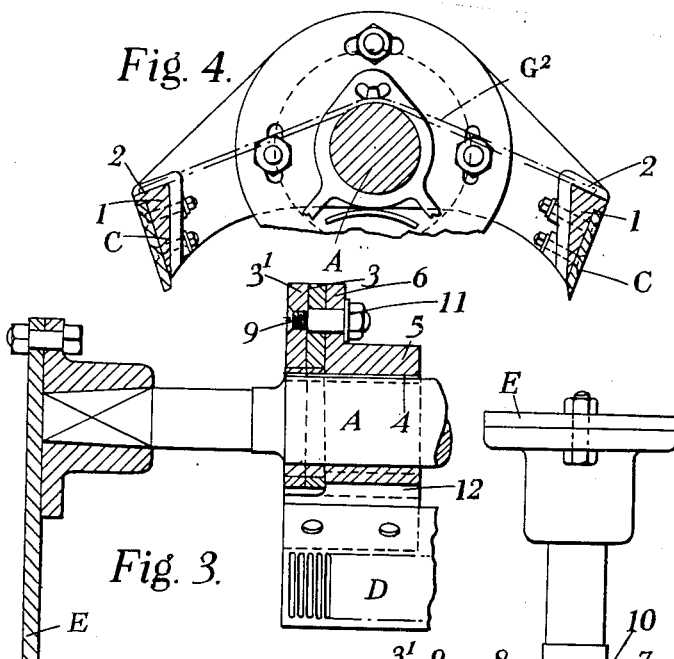
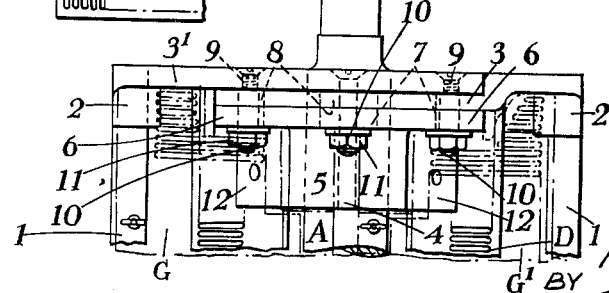
INVENTOR
B. M. Middleton.
BY
ATTORNEY

UNITED STATES PATENT OFFICE 1,923,838

COTTON GIN

Brian McLaren Middleton, Bedford, England, assignor of one-half to W. G. Armstrong Whitworth & Company, (Engineers) Limited, Newcastle-upon-Tyne, England Application June 1, 1931, Serial No. 541,411, and in Great Britain June 2, 1930

8 Claims. (Cl. 19—52)

This invention relates to cotton gins of the double roller Macarthy type.

In such gins adjustment of the overlap of the fixed and moving knives, which is necessary owing to variation in the staple of the raw cotton, has previously been effected by adjusting the stroke of the crank which imparts movement to the beater shaft. This method of adjustment has the objection that it is not possible to adjust separately the knives which are carried by arms at each end of the beater shaft and one or more intermediate support arms, and the further objection that any such adjustment of the knives alters the stroke of the grid which is undesirable.

The main object of this invention is to provide a mounting for the moving knives which permits of a more accurate method of adjustment of each knife separately and facilitates their replacement, and preferably eliminates the intermediate support arms. A further object of the invention is to provide means whereby the gin is rendered self-feeding. According to the invention the moving knives are supported from arms at each end of the beater shaft, each of which arms is angularly adjustable about the axis of the said shaft so as to permit of an adjustment in the angular separation of the knives. For this purpose the beater shaft may conveniently be provided with end plates to which the arms are adjustably bolted, and the said end plates may consist of flanged collars keyed to the beater shaft and may also serve to support the grids.

According to another feature of the invention a stiffening bar is provided connecting each pair of arms, to which bar the knives are detachably secured. Preferably each arm is formed with a socket for the reception of the stiffening bar, which is detachably bolted to its sockets.

According to a further feature of the invention a grid device is provided over the knives and beater shaft for the purpose of supporting the weight of the raw cotton seed in the hopper.

The invention is illustrated in the accompanying drawing in which,

Fig. 1 is a transverse section showing certain parts in elevation of one of two identical ends in a gin constructed in accordance with the invention.

Fig. 2 is a plan.

Fig. 3 is a vertical axial section.

Fig. 4 is a fragmentary view showing an alternative mounting of the additional grid.

Referring more particularly to the drawing, A indicates the beater shaft, and B and C the fixed and moving knives respectively. D are the grids. E is an arm which is operated by a crank (not shown) to impart oscillating movement to the beater shaft. F is the hopper.

Each moving knife C is secured to a stiffening bar 1, which with its knife, is detachably bolted to a socket 2 formed on arms 3 and 3'. The arms 3 and 3' are adjustably bolted on end plates keyed at 4 to the beater shaft A, which plates consist of collars 5 having flanges 6. The flanges 6 have segmental slots 7 formed therein and similar slots 8 are formed in the arms 3, the outer arms 3' having tapped holes 9 for the screw studs 10. This arrangement is to enable the nuts 11 to be screwed from the inside, and so that the outer face of the arm 3' has a flush surface.

Bolted to lugs 12 on the collars 5 are the grids D, and it will be seen that these grids will receive a constant throw irrespective of any adjustment of the knives.

In Figs. 1 and 2 there is shown in dotted line the outline of an additional grid which may be fitted for the purpose of supporting the weight of the raw cotton seed in the hopper. This additional grid device may either be fitted in two portions, in which case two separate grids G, $G^1$ are secured to the stiffening bars 1, their inner edges being supported by the beater shaft A but not abutting against one another so as to permit adjustment of the knives; while they may be secured either to the beater shaft A by wing nuts 13, or to the bars 1 by wing nuts 14. Alternatively as shown in Fig. 4, a single grid $G^2$ may be secured to the beater shaft with its outer edges resting upon but not secured to the stiffening bars.

In both cases the spring of the material from which the grids are formed is sufficient to maintain the grid in contact in the first case with the beater shaft and in the second with the stiffening bars.

The provision of this additional grid renders the gin self-feeding and thus does away with an operator at each machine as is the case at present.

I claim:—

1. A double roller gin of the Macarthy type comprising a beater shaft and knives adapted to move with said shaft, oppositely disposed single arms mounted at each end of and adapted to move with said shaft, means for angularly adjusting said arms relatively to the beater shaft and to one another, pairs of said arms being adapted to have the said knives mounted between them.

2. A double roller gin of the Macarthy type according to claim 1, end plates fast on the said shaft, and means for adjustably bolting the said arms to the said end plates.

3. A double roller gin of the Macarthy type, comprising a beater shaft, two angularly adjustable knife-carrying arms at each end of said shaft, flanged collars keyed to the said shaft, said collars having segmental holes in the flanges thereof, one of the arms at each end of the beater shaft having similar holes therein, the other arm being provided with bolt holes and means for clamping together the flanges and arms.

4. A double roller gin of the Macarthy type according to claim 1 wherein stiffening bars connect pairs of the said arms, the said stiffening bars being adapted to have the knives secured thereto.

5. A double roller gin of the Macarthy type according to claim 1 wherein sockets are formed on the arms and stiffening bars in said sockets, the said stiffening bars being adapted to have the knives secured thereto.

6. A double roller gin of the Macarthy type according to claim 1 comprising grid means over the knives and the beater shaft.

7. A double roller gin of the Macarthy type according to claim 1 comprising two grids over the knives and beater shaft one on each side thereof and spaced apart to allow for relative movement, and means for securing each grid along one of its longer sides.

8. A double roller gin of the Macarthy type according to claim 1 comprising a single grid over the knives and beater shaft, and means for securing the grid to the beater shaft.

BRIAN McLAREN MIDDLETON.